United States Patent [19]

Buschbom et al.

[11] Patent Number: 4,585,385

[45] Date of Patent: Apr. 29, 1986

[54] BOTTOM UNLOADER

[75] Inventors: Floyd E. Buschbom, Long Lake; Glen D. Hansen; Donald L. Henke, both of Maple Plain, all of Minn.

[73] Assignee: Veda, Inc., Long Lake, Minn.

[21] Appl. No.: 671,804

[22] Filed: Nov. 15, 1984

Related U.S. Application Data

[63] Continuation of Ser. No. 344,522, Feb. 1, 1982, abandoned.

[51] Int. Cl.[4] ............................................. B65G 65/46
[52] U.S. Cl. .................................... 414/311; 198/813; 198/860.4; 414/310
[58] Field of Search ...................... 198/661, 813, 861; 414/306, 309, 310, 311

[56] References Cited

U.S. PATENT DOCUMENTS

| Re. 25,863 | 9/1965 | Laidig | 215/233 |
|---|---|---|---|
| Re. 26,863 | 4/1970 | Weaver et al. | 418/61 R |
| 1,053,985 | 2/1913 | Grim | 198/861 |
| 2,352,749 | 7/1944 | Wills | 198/661 X |
| 2,551,216 | 5/1951 | Martin | 99/479 |
| 3,233,755 | 2/1966 | Glenn | 414/310 |
| 3,513,994 | 5/1970 | DeBower et al. | 414/310 |
| 3,802,583 | 4/1974 | Tinsley et al. | 414/311 |
| 3,817,409 | 6/1974 | Weaver | 414/307 |
| 3,828,919 | 8/1974 | Holtsclaw et al. | 198/861 X |
| 3,851,774 | 12/1974 | Laidig et al. | 414/310 X |
| 4,330,233 | 5/1982 | Weaver | 414/310 |
| 4,386,695 | 6/1983 | Olson | 414/310 X |

Primary Examiner—Robert J. Spar
Assistant Examiner—Janice Krizek
Attorney, Agent, or Firm—Burd, Bartz & Gutenkauf

[57] ABSTRACT

A bottom unloader having a material conveyor for moving material from a hopper centrally located in a bin to a location outside of the bin. A drive apparatus mounted on the outer end of the conveyor operates the conveyor and adjusts the tension on the conveyor chain. The outer end of the conveyor has a door that is clamped to a closed position with eccentric clamping locks. An elongated auger collector is mounted on a rotatable turntable located in the central hopper. A cap having a side opening for the auger collector is mounted on the turntable. The auger collector is drivably connected with the conveyor so that, when the conveyor is operated, the auger collector is rotated. A separate drive operated with a hydraulic motor is used to move the auger collector in a circular path.

50 Claims, 17 Drawing Figures

BOTTOM UNLOADER

This is a continuation of application Ser. No. 344,522 filed Feb. 1, 1982, abandoned.

SUMMARY OF INVENTION

The invention is directed to a material handling apparatus operable to remove material from the bottom of a material storage area to a desired location. The material apparatus is a bottom unloader operable to remove material from the bottom of a storage area, such as a storage structure, bin, or silo, and discharge the material externally of the storage area. The bottom unloader has a material conveyor assembly extended from a centrally located material collecting housing to a location externally of the material storage structure. The conveyor assembly has elongated tubular members having passageways for accommodating an endless conveyor chain. Paddles secured to the chain are operable to move material from the central material collecting housing externally of the storage structure.

A drive assembly having a drive sprocket engageable with the chain is adjustably mounted on the conveyor assembly. The drive assembly includes a motor operating power transmitting means for rotating the sprocket. The entire drive assembly, including the motor, is mounted on a support that is movable relative to the conveyor assembly. A chain tension adjusting assembly operably connected to the conveyor assembly and drive assembly is used to adjust the position of the drive assembly on the conveyor assembly and thereby adjust the tension on the conveyor chain.

The conveyor assembly has an outer end having a discharge opening. A door clamped onto the outer end of the conveyor assembly closes the discharge opening when the unloader is not used. Eccentric clamping lock means holds the door in a tight closed relationship relative to the discharge end of the conveyor assembly.

The inner end of the conveyor chain drives a power transmitting means, including a sprocket, gear box, and chain and sprocket drive, for rotating an elongated radially extended auger collector. The auger collector is mounted on a turntable that is driven with a hydraulic motor about an upright axis. The auger collector is mounted on a fixed tube attached to the turntable. The tube supports a drive shaft used to transmit power to a mid-section of the auger collector. The auger collector is moved laterally in a circular path by the rotating turntable. The inner end of the auger collector and drive for the auger collector is covered with a cap mounted on the turntable. The cap has a side opening allowing the auger collector to project in a generally radial direction. The opening in the cap restricts gravity feed of the material into the material collecting housing. The material is metered into the material collecting housing by the rotating auger collector simultaneously with the operation of the conveyor, which carries the material from the material collecting housing to the discharge opening of the conveyor assembly.

An object of the invention is to provide a bottom unloader with a material collector that meters the material to a conveyor assembly as the collector moves in a generally circular path. A further object of the invention is to provide a bottom unloader with a material collector wherein the speed of the operation of the material collector controls the volume of material discharged by the unloader. A further object of the invention is to provide a bottom unloader which does not rely on gravity to feed material to a material collecting hopper associated with a conveyor assembly. Yet another object of the invention is to provide a bottom unloader with a drive apparatus that is adjustably mounted on the conveyor to adjust the conveyor chain tension. Another object of the invention is to provide a bottom unloader with an auger collector having a drive shaft that is drivably connected to auger members in a generally central location. Still another object of the invention is to provide a conveyor assembly of a bottom unloader with a removable door adapted to be clamped in a position to close and seal the material exit opening of the conveyor assembly to prevent air from flowing through the conveyor assembly into the stored material. These and other objects and advantages of the invention are embodied in the bottom unloader shown in the drawings and described in the following specification.

DESCRIPTION OF PREFERRED EMBODIMENT

Figures 1, 2, 3:
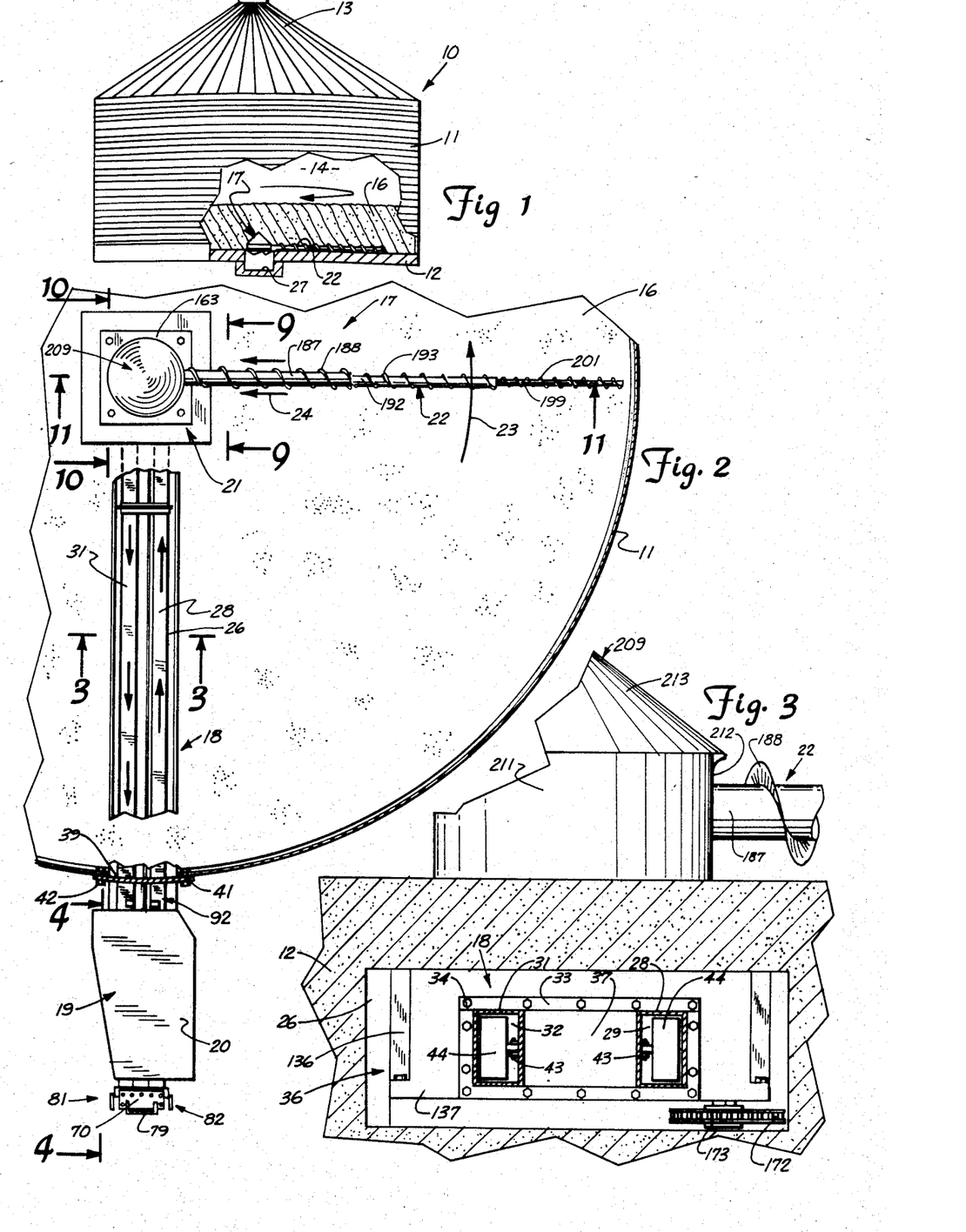
FIG. 1 is an elevational view of a grain storing bin partly broken away to show the bottom unloader of the invention.
FIG. 2 is a top view of the bottom unloader of FIG. 1.
FIG. 3 is an enlarged sectional view taken along the line 3—3 of FIG. 2.

Referring to FIG. 1, there is shown a material storage structure or bin indicated generally at 10 having a cylindrical side wall 11 mounted on a generally horizontal floor 12. An inverted cone-shaped roof 13 is attached to the top of side wall 11. The side wall 11 surrounds a cylindrical chamber 14 accommodating particulate material 16, such as agricultural crops, including wheat, corn, oats, soybeans, sunflower seeds, and like grains. The material storage structure 10 can be a silo or storage area for storing grains, seeds, feeds, sand, lime, coal, and similar bulk granular materials.

A material handling apparatus indicated generally at 17, herein termed a bottom unloader, is operatively positioned on floor 12 to remove material 16 from the bottom of the chamber 14 and convey the material outside of bin 10. Bottom unloader 17 has a conveyor assembly 18 having an outer end supporting a drive apparatus 19. A material collecting housing supporting a turntable assembly 21 is located at the inner end of conveyor assembly 18. A material collector indicated generally at 22 is operatively mounted on turntable assembly 21 and extends in a generally radial direction toward side wall 11. Collector 22 concurrently rotates and laterally moves or sweeps in a circular path relative to floor 12 in the direction of arrow 23 and functions to convey material radially inwardly, as shown by arrows 24, towards turntable assembly 21. Collector 22 can be driven to sweep in a direction opposite arrow 23. Collector 22 meters material from the bottom of bin 10 to conveyor assembly 18, which moves the material outside of bin 10. Conveyor assembly 18 does not rely on gravity to feed material to the input section of the conveyor assembly. The metering of material by collector 22 is a force feeding of a controlled amount of material to the input section of the conveyor assembly. The speed of rotation and sweep speed and direction of collector 22 and size of opening 212 in cap 209 controls the metering of material to conveyor assembly 18.

Figure 9:
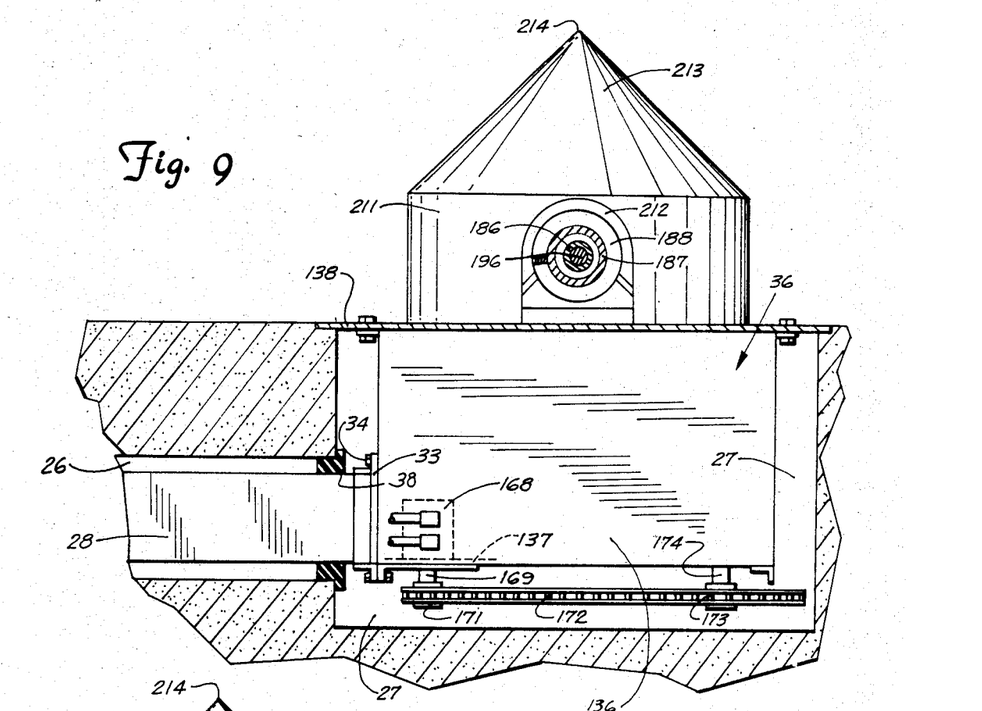
FIG. 9 is an enlarged sectional view taken along the line 9—9 of FIG. 2.
Figure 10:
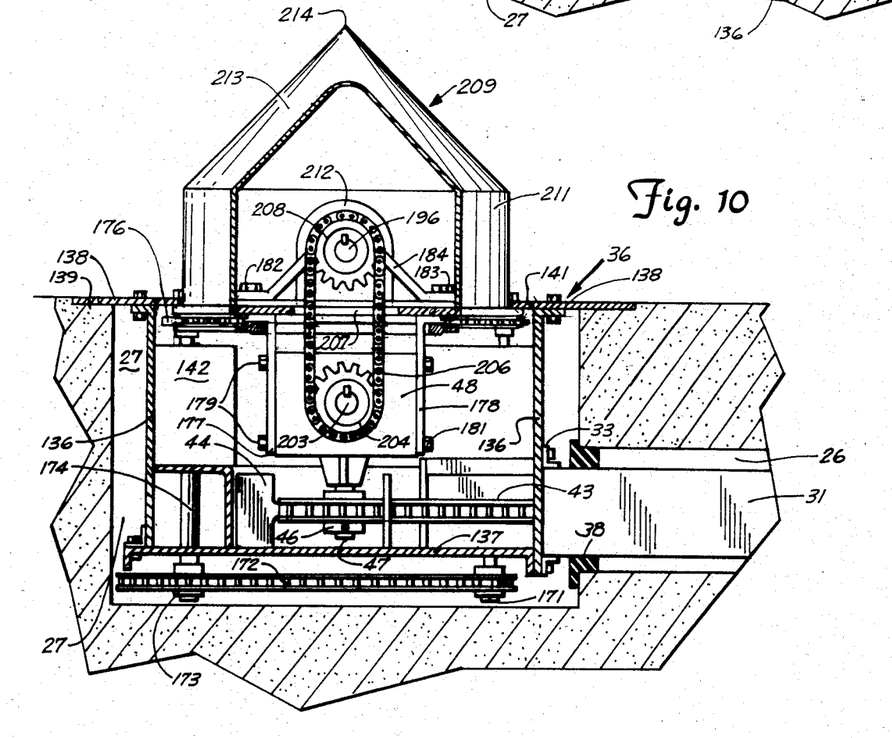
FIG. 10 is an enlarged sectional view taken along the line 10—10 of FIG. 2.

As shown in FIGS. 2, 3, 9, and 10, floor 12 has a radial passage 26 extended from a central pit 27 to side wall 11. Side wall 11 has an opening 39 allowing the outer end section of conveyor assembly 18 to project through side wall 11. A drive apparatus 19 for conveyor assembly 18 is located externally of side wall 11. A drive mechanism and motor, hereinafter described, are located under a shield or cover 20. Passage 26 has a generally rectangular cross section and accommodates a pair of longitudinal box beams or tubular members 28 and 31. As shown in FIG. 3, tubular members 28 and 31 have generally rectangular cross sections and longitudinal passageways 29 and 32, respectively. An outwardly directed flange 33 connected to the inner end of tubular members 28 and 31 is secured with bolts 34 to a housing indicated generally at 36. Housing 36 is a material collecting hopper located in pit 27 that rotatably supports turntable assembly 21. A spacer plate 37, as shown in FIG. 3, is located between the inner ends of tubular members 28 and 31. As shown in FIGS. 9 and 10, a seal or gasket 38 located at the inner end of passage 26 surrounds tubular members 28 and 31 to prevent air from flowing into pit 27. A plate 41 surrounding the outer end of tubular members 28 and 31 is secured outside of side wall 11 with a plurality of bolts 42 to support the outer end of members 28 and 31 on wall 11.

A single chain conveyor comprising an endless link chain 43 and a plurality of upright paddles 44 secured to chain 43 is located in passageways 29 and 32 of tubular members 28 and 31, respectively. The inner end of chain 43 is in engagement with a drive sprocket 46 mounted on a downwardly directed shaft 47 of a gear box 48. The operation and function of gear box 48 is hereinafter described. The outer end of chain 43 is located about a drive sprocket 49 mounted on the lower end of an upwardly directed drive shaft 51.

Figures 4, 5, 6, 8:
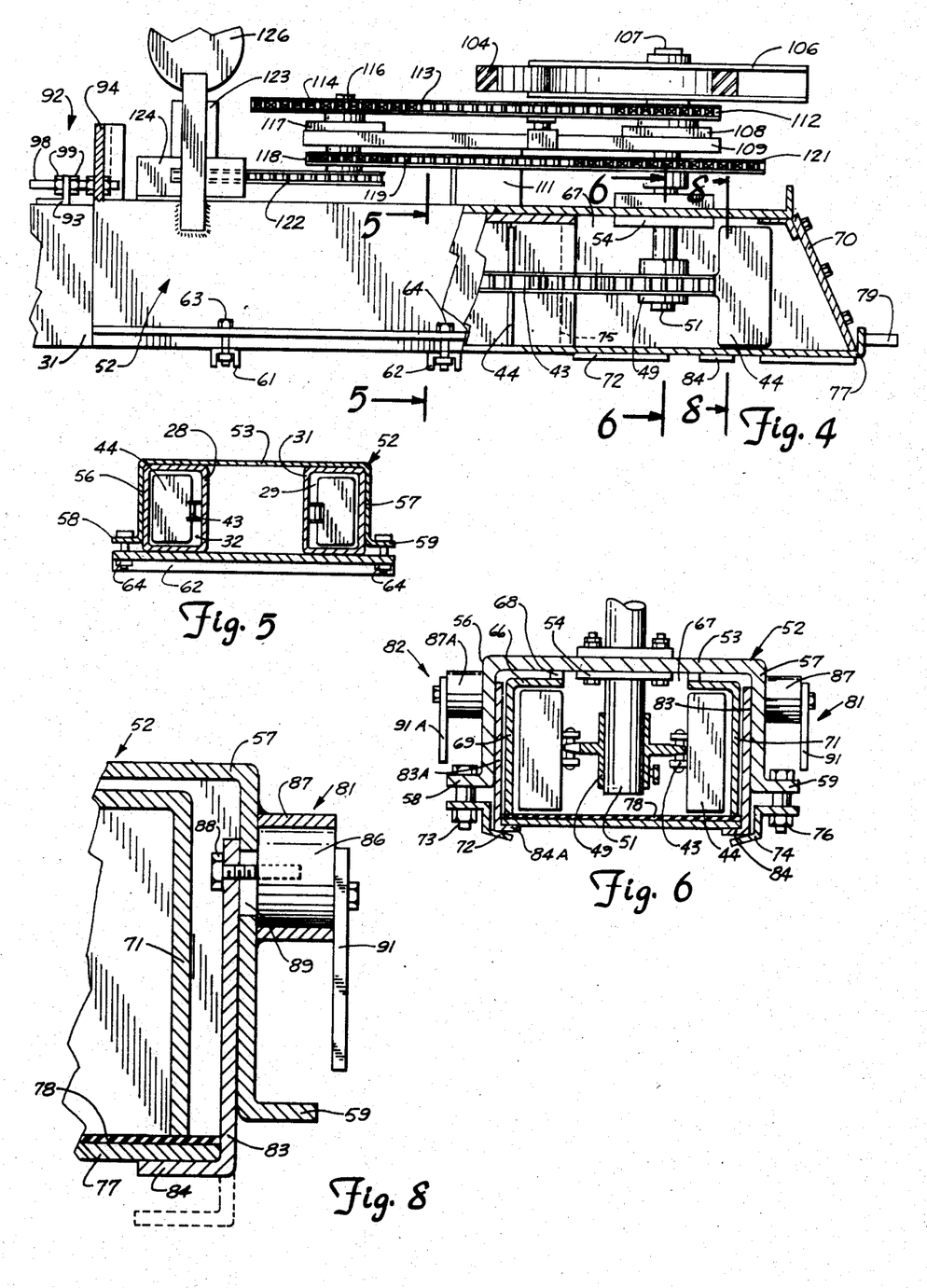
FIG. 4 is an enlarged view, partly sectioned, taken along the line 4—4 of FIG. 2.
FIG. 5 is a sectional view taken along the line 5—5 of FIG. 4.
FIG. 6 is a sectional view taken along the line 6—6 of FIG. 4.
FIG. 8 is an enlarged sectional view taken along the line 8—8 of FIG. 7.

As shown in FIGS. 4, 5, and 6, an inverted generally U-shaped support indicated generally at 52 is mounted on the outer end of tubular members 28 and 31. Support 52 has a generally flat top wall 53 accommodating a bearing 54 for shaft 51. Downwardly directed side walls 56 and 57 are secured to opposite sides of top wall 53. The side walls have outwardly directed longitudinal flanges 58 and 59. A pair of channel-shaped cross members 61 and 62 engageable with the bottoms of tubular members 28 and 31 cooperate with nut and bolt assemblies 63 and 64 to clamp support 52 onto the outer end section of conveyor assembly 18. Support 52 is the base or support for drive apparatus 19. Drive apparatus 19 is mounted on and can be removed from conveyor assembly 18 as an assembled unit. The U-shaped support 52 is attached to conveyor assembly 18 by clamping cross members 61 and 62 and support 52 to conveyor assembly 18 and connecting chain tension adjusting apparatus 92. This unit assembly of drive apparatus 19 on conveyor assembly 18 allows drive apparatus 19 to be put together at the factory and shipped as a unit to the bin site. Also, drive apparatus 19 can be shipped separately from other parts of bottom unloader 17.

A U-shaped end extension 66 is secured to the outer ends of tubular members 28 and 31. Extension 66, as shown in FIG. 6, has a top opening 67 to accommodate bearing 54. An annular seal 68 is interposed between the top of end extension 66 and the support wall 53 to eliminate the entrance of air into conveyor assembly 18. End extension 66 has downwardly directed side walls 69 and 71 that provide a bottom discharge opening for conveyor assembly 18. A removable outer end plate 70 is attached to the outer ends of side walls 69 and 71. The space between the outer ends of tubular members 28 and 31 is closed with a transverse plate 75. A door 77 having an upper yieldable or rubber sheet 78 engages the lower edges of side walls 69 and 71 to close the discharge opening. Door 77 comprises a rectangular flat rigid plate having an upper side carrying a sheet or layer of yieldable material, such as rubber or plastic. Door 77 rides on side rails 72 and 74 connected with nut and bolt assemblies 73 and 76, respectively, to the flanges 58 and 59. As shown in FIGS. 2 and 4, a U-shaped handle 79 is attached to the outer end of door 77 to facilitate longitudinal movement of the door between its open and closed positions.

Figures 7, 14:
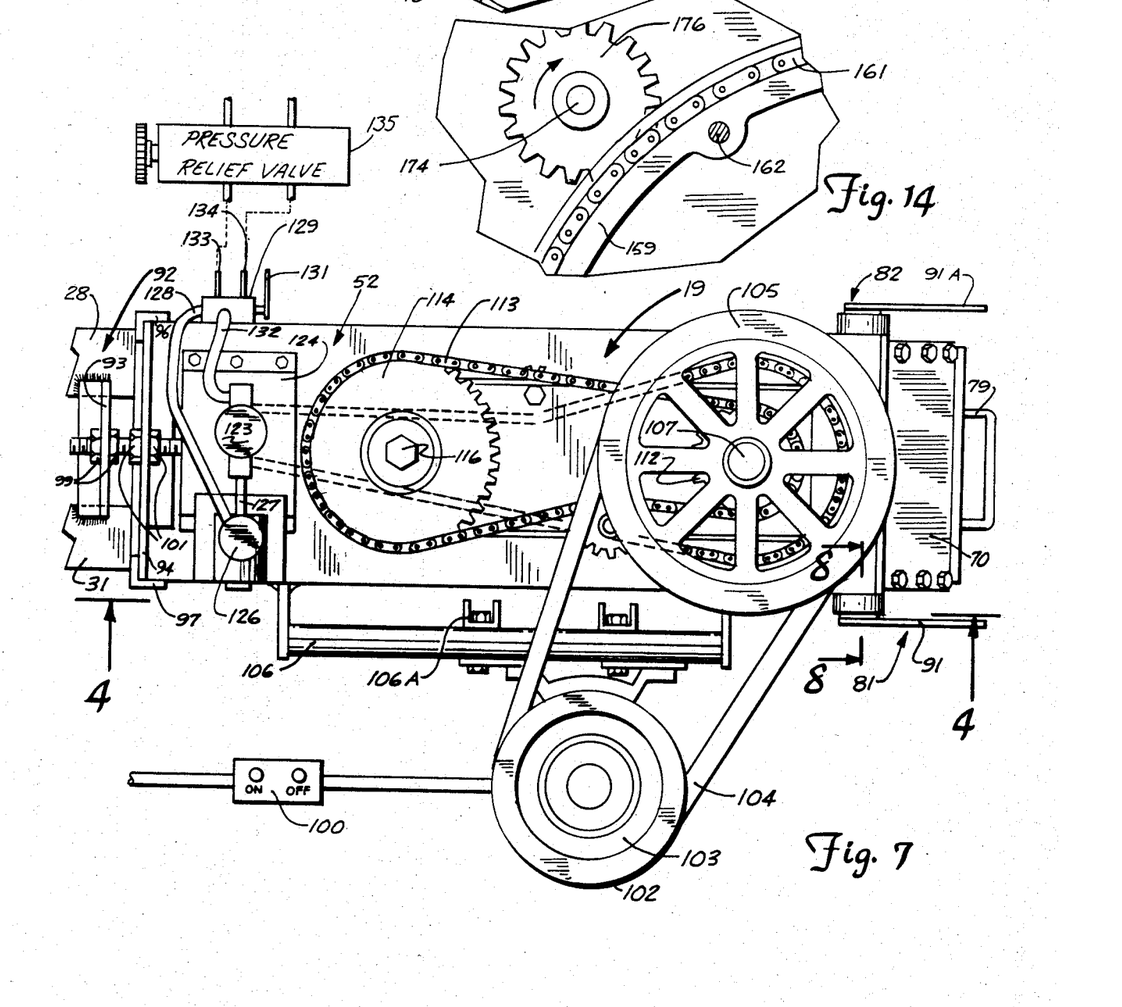
FIG. 7 is a top plan view of FIG. 4.
FIG. 14 is an enlarged sectional view taken along the line 14—14 of FIG. 11.

Door 77 is held in sealing engagement with the bottom of side walls 69 and 71 and removable end plate 70 with a pair of releasable clamp and lock assemblies indicated generally at 81 and 82 in FIGS. 2, 6, and 7. FIG. 8 shows the details of releasable clamp and lock assembly 81. Assembly 82 has identical structure and engages the opposite side of door 77. Assembly 81 has a downwardly directed arm 83 terminating in an inwardly directed finger 84. Arm 83 is located between support side wall 57 and end extension side wall 71. Finger 84 projects under and engages the bottom of one side of door 77. The upper end of arm 83 is located ajdacent a roller 86. Roller 86 is rotatably mounted in a cylindrical sleeve 87 secured by welds or the like to the outside of side wall 57. A bolt 88 pivotally attaches the upper end of arm 83 to roller 86 laterally of the center or axis of rotation of roller 86. Bolt 88 extends through an enlarged hole or slot 89 in side wall 57 thereby allowing arm 83 to move upwardly, whereby finger 84 holds door 77 in clamping relation relative to the bottom edge of side wall 71. A linear handle 91 is secured to the outer side of roller 86. The handle 91 is used to facilitate rotation of roller 86 in sleeve 87 thereby selectively clamping and releasing door 77. When handle 91 is moved upwardly, bolt 88 moves down thereby moving the finger down, as shown in broken lines in FIG. 8, to the release position. Assembly 82 has parts that are identical to lock assembly 81 that are identified with the same reference numbers having the suffix A. When the lock assemblies 81 and 82 are released, door 77 can be pulled with the use of handle 79 from the end extension 66 thereby opening the discharge opening to allow the chain conveyor to discharge material from the outer end of conveyor assembly 18 to a conveyor (not shown) or other apparatus for moving the material to a desired location.

The tension on chain 43 is adjusted by adjusting the longitudinal position of support 52 relative to tubular members 28 and 31 and end extension 66. As shown in FIGS. 4 and 7, the chain tension adjusting apparatus indicated generally at 92 is used to selectively longitudinally position support 52 on the tubular members 28 and 31. Apparatus 92 comprises a cross member 93 secured to the tubular members 28 and 31. An upright plate 94 is attached to support 52 between upright posts 96 and 97 secured to opposite sides of support 52. Shield 20 is adapted to be attached to posts 96 and 97. A threaded rod 98 extends between the cross member 93 and plate 94. A first pair of adjusting nuts 99 mount threaded rod 98 on cross member 93. A second pair of adjusting nuts 101 mount threaded rod 98 on plate 94. Chain tension is adjusted by releasing cross members 61 and 62 and adjusting nuts 99 on rod 98. Nuts 99 and 101 can be adjusted relative to the threaded rod 98 to locate the support 52 in a selected longitudinal position relative to the tubular members 28 and 31. Cross members 61 and 62 then are clamped into clamping engagement with the tubular members 28 and 31 to fix the position of support 52 and maintain the adjusted tension on chain 43.

The drive apparatus indicated generally at 19 in FIGS. 4 and 7 comprises a power unit shown as an electric motor 102 having a drive pulley 103. A switch 100 connects motor 102 to an electric power supply. An endless flexible belt 104 connects drive pulley 103 to a large driven pulley 105. Driven pulley 105 is mounted on an upright shaft 107. Motor 102 is adjustably mounted on a pair of parallel bars 106 secured to the side of support 52 with a pair of clamp units 106A. A crank having a threaded rod (not shown) is used to move units 106A along bars 106. Nut and bolt assemblies cooperating with the clamp units 106A hold motor 102 in a selected position relative to bars 106 and thereby maintain tension on belt 104.

Shaft 107 is rotatably mounted in a bearing 108 attached to a generally horizontal frame 109. An upright member 111, as shown in FIG. 4, attaches frame 109 to the top of support 52 thereby fixing frame 109 relative to support 52. A sprocket 112 is secured to shaft 107 below pulley 106. An endless link chain 113 engages sprocket 112 and a large sprocket 114 mounted on an upright shaft 116. A bearing 117 rotatably mounts shaft 116 on frame 109. A second sprocket 118 is mounted on the lower end of shaft 116 below frame 109. An endless link chain 119 engages sprocket 118 and a large sprocket 121. Sprocket 121 is secured to the top of shaft 51. The chain and sprocket drives between the pulley 106 and shaft 51 function as a speed reducing power transmitting means that drivably connects motor 102 to shaft 51. Operation of the motor 102 causes shaft 51 to rotate and chain 43 to move in its elongated endless path. Paddles 44 attached to chain 43 move material from housing 136 through passage 32 of tubular member 31 to the discharge opening in end extension 66.

Motor 102 also drives a power transmitting belt and pulley arrangement 122 connected to the bottom of shaft 116. Arrangement 122 is drivably connected to a hydraulic pump 123 mounted on a bracket 124. As shown in FIG. 7, bracket 124 is secured to the top of support 52.

The inlet of pump 123 is connected to a reservoir 126 with a hose 127. A return hose 128 connects reservoir 126 with an on-off-on directional control valve 129 mounted on the side of support 52. Valve 129 has a lever actuator 131 operable to control the direction of fluid through the valve to control the direction sweep of collector 22. A supply hose 132 connects the output of pump 123 to valve 129. A pair of lines 133 and 134 connect valve 129 to an adjustable pressure relief valve 135 and a hydraulic motor 168 operable to rotate a turntable 149, hereinafter described.

Figures 11, 12, 13, 16, 17:
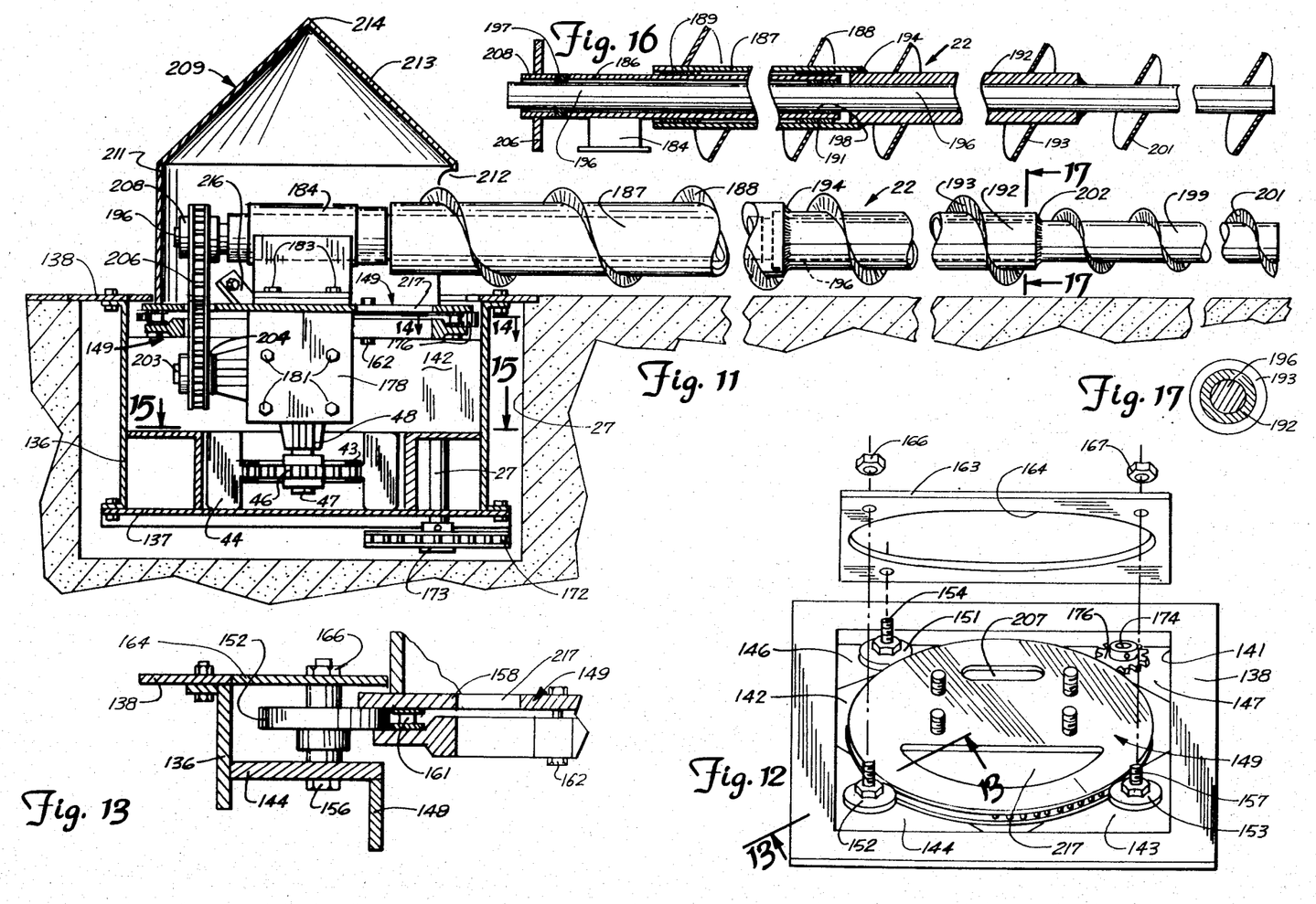
FIG. 11 is an enlarged foreshortened sectional view taken along the line 11—11 of FIG. 2.
FIG. 12 is a perspective view of the top of the turntable.
FIG. 13 is a sectional view taken along the line 13—13 of FIG. 12.
FIG. 16 is a longitudinal sectional view of the collector auger assembly.
FIG. 17 is an enlarged sectional view taken along the line 17—17 of FIG. 11.

Referring to FIGS. 9 and 10, housing 36 is a square box-shaped hopper having upright side walls 136 secured to a generally horizontal bottom wall 137. A top wall 138 surrounds and is secured to the upper edge of the side walls 136. Top wall 138 extends in an outward direction and has an outer edge located in a recess 139 in floor 26 surrounding pit 27. Top wall 138, as shown in FIG. 12, has a generally square opening that is in communication with a chamber 142. Generally triangular shoulder plates 143, 144, 146, and 147 are secured to the corners of the upper section of side walls 136. Corner plates 148 extend downwardly from each shoulder plate to bottom wall 137.

A turntable indicated generally at 149 is located in the upper portion of chamber 142. A plurality of rollers 151, 152, and 153 rotatably support turntable 149 for rotation about a generally upright axis. Roller 151 is mounted with a bolt 154 on the shoulder plate 146. As shown in FIGS. 12 and 13, roller 152 is rotatably mounted on shoulder plate 144 with an upright bolt 156. Roller 153 is rotatably mounted on shoulder plate 143 with a bolt 157. As shown in FIG. 13, turntable 149 comprises an upper circular plate 158 and a lower circular plate 159. A circular endless link chain 161 is located between plates 158 and 159. A plurality of nut and bolt assemblies 162 clamp plates 158 and 159 onto chain 161. As shown in FIG. 13, roller 152 has an outer edge that fits between the outer peripheral edges of plates 158 and 159 thereby rotatably supporting the turntable 149. Rollers 151 and 153 have similar outer peripheral edges that extend between plates 158 and 159. A cover plate 163 having a circular opening 164 is secured to bolts 152, 154, and 157 with nuts 166 and 167. Cover plate 163 has an outer rectangular shape that fits into the rectangular opening 141 of top wall 138.

Figure 15:
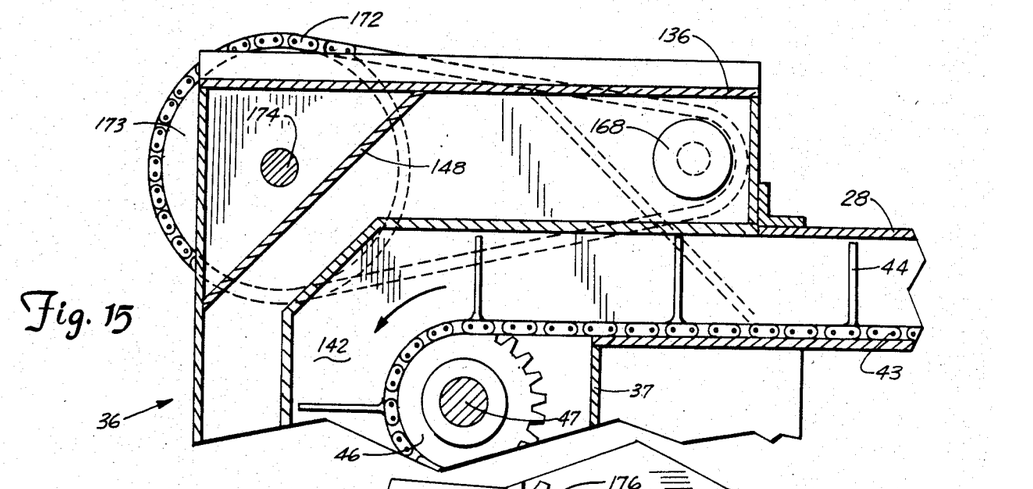
FIG. 15 is an enlarged sectional view taken along the line 15—15 of FIG. 11.

As shown in FIGS. 9 and 15, a hydraulic motor 168 located in a corner of housing 36 and attached to housing 36 is operable to rotate turntable 149 about its upright axis. Motor 168 has a downwardly directed drive shaft 169 carrying a small sprocket 171. A chain 172 engages sprocket 171 and a large sprocket 173 mounted on an upright shaft 174. Shaft 174 extends through the shoulder plate 147 and is rotatably mounted thereon with suitable bearings (not shown). A gear 176 is secured to the upper end of shaft 174. Gear 176 has outwardly directed circumferential teeth that engage chain 161 clamped between the upper and lower turntable plates 158 and 159. As shown in FIG. 14, rotation of the gear 176 will rotate the turntable 149 as the teeth of the gear 176 engage chain 161 to transmit a rotational force thereto.

A support 184 is mounted on top of turntable 149 with the nut and bolt assemblies 182 and 183. Support 184 has a fixed elongated tube 186 extended in a generally horizontal radial direction.

As shown in FIGS. 11 and 16, material collector 22 is an elongated auger assembly extended radially from support 184 toward bin side wall 11. Collector 22 has a first tubular member 187 telescoped over fixed tube 186. A pair of sleeve bearings 189 and 191 rotatably mount opposite ends of member 187 on tube 186. A continuous helical flight 188 surrounds tubular member 187 and is secured thereto. A second tubular member 192 is located adjacent the outer end of tubular member 187 and is secured thereto with an annular weld 194. A second continuous helical flight 193 surrounds and is secured to second tubular member 192. Helical flight 193 has the same twist as flight 188 and a diameter that is smaller than the diameter of helical flight 188.

An elongated drive shaft 196 extends through the horizontal passages of fixed tube 186 and of second tubular member 192. Bearings 197 and 198 rotatably mount shaft 196 on fixed tube 186 for rotation about the longitudinal axis of fixed tube 186. Shaft 196 has an outer end section 199 that projects outwardly in a radial direction from the outer end of second tubular member 192. A third continuous helical flight 201 surrounds and is secured to the outer end section 199. Flight 201 has the same twist as flights 188 and 192 and a diameter smaller than the diameter of flight 193. A weld 202 secures end section 199 to the outer end of tubular member 192. As shown in FIGS. 16 and 17, second tubular member 192 has an inside diameter that provides a close fit between shaft 196 and tubular member 192 so that the lateral forces on tubular member 192 are distributed along the midsection of shaft 196. The lateral forces on first tubular member 187 are transmitted to fixed tube 186 via bearings 189 and 191.

Referring to FIGS. 10 and 11, gear box 48 has a horizontal output shaft 203. A sprocket 204 drivably mounted on shaft 203 engages an endless link chain 206. Link chain 206 extends upwardly through a slot or hole 207 in the turntable 149 and extends about a sprocket 208 mounted on the end of drive shaft 196. The gear box 48, chain 206, and sprockets 203 and 208 are a power transmitting drive that rotates auger collector 22 simultaneously with the operation of conveyor assembly 18 and concurrently controls the speed of operation of both the collector 22 and conveyor assembly 18.

As shown in FIGS. 9, 10, and 11, support 184 and chain and sprocket drive for drive shaft 196 are enclosed within a cap indicated generally at 209 mounted on turntable 149. Cap 209 has a cylindrical upright side wall 211 provided with an opening 212 for tubular member 187 and its helical flight 188. The opening 212 has a generally inverted U-shape and is aligned with an opening 217 through the turntable 149. A cone-shaped top 213 is joined to the top of the cylindrical wall 211. Top 213 converges upwardly to a central point or apex 214. A plurality of brackets 216 located adjacent the inside of cylindrical wall 211 secures cap 209 to the top of turntable 149. Cap 209 insures that material 16 in bin 10 is auger fed through opening 212 for discharge through the turntable opening 217 into chamber 142. There is a minimum of gravity feed of material through opening 212, since opening 212 is only slightly larger than the outer diameter of helical flight 188. The discharge capacity or volume of material that is unloaded from bin 10 is determined by the speed of rotation of collector 22, the sweep movement speed and direction of collector 22, and the size of opening 212. Collector 22 meters material through opening 212 for discharge through turntable opening 217 into chamber 142. Paddles 44 attached to chain 43 pick up material from the bottom of chamber 142 and move the material through passage 32 of tubular member 31 to the discharge opening in end extension 66.

In use, the electric motor 102 operates to drive apparatus 19 to rotate drive sprocket 49 located in the discharge end of conveyor assembly 18. Sprocket 49 moves chain 43 whereby paddles 44 secured to chain 43 pick up material from the material collecting housing chamber 142, as shown in FIG. 10, and transport the material via the passageway 32 in tubular member 31 to the discharge opening. The conveyor chain 43 drives sprocket 49 connected to gear box 48 located in the material receiving housing. Gear box 48 is attached to a turntable 149.

Generally horizontal material collector 22 is mounted on turntable 149 with support 184 and fixed tube 186. Collector 22 comprises an auger assembly having a tubular member 187 telescoped over and rotatably mounted on fixed horizontal tube 186. Drive shaft 196 extended through fixed horizontal tube 186 and second tubular member 192 is secured to the outer end of member 192 whereby the power for rotating collector 22 is intermediate the ends of drive shaft 196. A chain and sprocket drive 206 transmits power from gear box 48 to the inner end of drive shaft 196 and thereby rotates collector 22. The mounting of rotating auger member 187 on fixed tube 186 and the driving of auger members 187 and 192 with shaft 196 projected through tube 186 and member 192 from the outer end of member 192 permits the use of knives on flights 188, 193, and 201. Knives are secured to the outer portions of flights 188, 193, and 201 and project radially outward therefrom. Knives facilitate the material cutting and conveying function of collector 22.

Drive apparatus 19 operates a hydraulic fluid pump 123. Manually operated on-off-on valve 129 controls the flow of hydraulic fluid under pressure to hydraulic fluid motor 168. Adjustable pressure relief valve 135 in the hydraulic circuit between valve 129 and motor 168 regulates the fluid pressure delivered to motor 168 and allows for substantially constant forward sweep pressure on collector 22. Pressure relief valve 135 allows for adjustment of sweep speed of collector 22 and will stall sweep movement in case collector 22 engages an obstruction. Motor 168, as shown in FIGS. 14 and 15, rotates a drive shaft 174 secured to a gear 176. Gear 176 has outwardly directed teeth that cooperate with circular chain 161. Chain 161 is secured to turntable 149 whereby, on rotation of gear 176, turntable 149 is rotated about a generally upright axis. Collector support 184, being secured to the top of turntable 149, laterally moves or sweeps collector 22 in a circular path about the upright axis of turntable 149. The direction of the lateral movement of collector 22 is controlled by valve 129. The material in bin 16 is metered into the hopper chamber 142 of housing 136 by the rotating and laterally moving collector 22. The metering rate or amount of material discharged by collector 22 into chamber 142 is a function of the speed of rotation of collector 22, the speed of sweep movement of collector 22, and the size of opening 212 in cap 209. The rotational speed and sweep speed and direction can be changed to change the metering rate of material. Also, the size of opening 212 can be changed to alter the metering rate of material to hopper chamber 142.

As shown in FIG. 16, flight 188 on first tubular member 187 extends through opening 212 in the side wall of cap 209. On rotation of collector 22, the helical flight 188 meters material 16 through opening 212 and discharges the material through opening 217 in turntable 149. The material falls into housing chamber 142. The inner end of conveyor chain 43 is located in the bottom of housing chamber 142 so that on operation of conveyor assembly 18 the material will be removed from chamber 142 by paddles 144 through passageway 32 of tubular member 31 to the discharge opening at the bottom of the conveyor end extension 66. The speed of the drive apparatus 19 controls the volume or amount of material that is handled by the unloader. A spring loaded variable drive pulley can be used to vary the speed of the drive apparatus whereby the operator of the unloader can vary the speed of operation of the unloader and thereby control the volume of the material unloaded from the bin.

While there has been shown and described the preferred embodiment of the bottom unloader, it is understood that changes in the structure, materials, and arrangement of structure can be made by those skilled in the art without departing from the invention. The invention is defined in the following claims.

The embodiments of the invention in which an exclusive property or privilege is claimed are defined as follows:

1. An apparatus for removing material from a material storage area having a floor for accommodating the material comprising: a housing having a chamber locatable in the central portion of the material storage area, material conveying means extended from the housing to a location externally of the storage area, said conveying means having a movable conveyor operable to move material from the chamber to said location, first drive means to operate the conveyor, turntable means rotatably mounted on said housing, material collector means mounted on the turntable means, said collector means extended from the turntable means toward the outer portion of the storage area, said material collector means comprising an elongated auger means having helical flight means, non-rotatable support means mounting the auger means on the turntable means for rotation about its longitudinal axis, housing means located over the turntable means, said housing means having a side wall with an opening accommodating an inner portion of the auger means operable to restrict the amount of material moved into the chamber by the auger means, power transmitting means connecting said conveyor to said material collector means whereby said first drive means simultaneously operates said conveyor and material collector means, said power transmitting means being connected to said auger means whereby on operation of the movable conveyor the power transmitting means rotates said auger means, and second drive means operably connected to said turntable means to rotate the turntable means and move said auger means relative to said floor independently of the operation of the conveyor and rotation of the auger means whereby the auger means moves material toward said turntable means and meters the material through the opening in the housing means into the chamber and said conveyor moves the material from the chamber to said location externally of the storage area.

2. The apparatus of claim 1 wherein: the housing has wall means surrounding said chamber, said material conveying means having passage means accommodating the movable conveyor secured to the wall means, and means rotatably mounted on the wall means rotatably supporting the turntable means for rotation about a generally upright axis.

3. The apparatus of claim 2 wherein: said turntable means has an annular outer portion, said means rotatably supporting the turntable means comprising roller means engageable with said annular outer portion.

4. The apparatus of claim 2 wherein: the wall means has shoulder means, and said means rotatably supporting the turntable means includes a plurality of rollers rotatably mounted on said shoulder means, each of said rollers having an annular portion engageable with said turntable means to rotatably support said turntable means for rotation about a generally upright axis.

5. The apparatus of claim 4 wherein: said turntable means comprises a pair of generally circular plates, annular chain means located between said plates to space said plates from each other, and means to hold said plates in clamping relation with said chain means, said rollers having outer annular portions located between said circular plates, said second drive means having means cooperating with said chain means to rotate said turntable means.

6. The apparatus of claim 5 wherein: said means cooperating with said chain means is a gear having teeth engageable with said chain means.

7. The apparatus of claim 5 wherein: the second drive means includes a gear having teeth engageable with said chain means.

8. The apparatus of claim 7 wherein: the second drive means includes motor means mounted on the housing, and power transmitting means drivably connecting the motor means to the gear whereby operation of the motor means rotates the turntable means.

9. The apparatus of claim 8 wherein: the motor means comprises a hydraulic fluid operated motor, pump means drivably connected to said first drive means operable to supply hydraulic fluid under pressure to said motor to operate said motor.

10. The apparatus of claim 1 wherein: the power transmitting means includes a gear box attached to the turntable means, said gear box having a first shaft drivably connected to the movable conveyor of the material conveying means, and a second shaft connected to the auger means.

11. The apparatus of claim 1 wherein: the first drive means includes a support movably mounted on the material conveying means, means engageable with the movable conveyor for driving said conveyor, said means engageable with the movable conveyor being movable with said support to adjust the tension of the movable conveyor, and adjusting means connected to the support and material conveying means for moving the support to adjust the tension of the movable conveyor.

12. The apparatus of claim 11 including: clamp means mounted on the support and engageable with the material conveying means to hold the support in a fixed position relative to said material conveying means.

13. The apparatus of claim 11 wherein: the material conveying means has a material discharge end section having a material discharge opening, said support having said walls located adjacent opposite sides of said end section, and said adjusting means having movable means operable to move the support relative to the end section.

14. The apparatus of claim 13 including: at least one clamp cross bar engageable with said material conveying means, and means to clamp the cross bar and support onto the material conveying means to hold the support in a fixed position relative to said material conveying means.

15. An apparatus for removing material from a material storage area having a floor for accommodating the material comprising: a housing having a chamber locatable in the central portion of the material storage area, material conveying means extended from the housing to a location externally of the storage area, said conveying means having a movable conveyor operable to move material from the chamber to said location, said conveying means including a pair of tubular members connected to the housing, each of said tubular members having a passage open to the chamber, said movable conveyor extended through said passages operable to move material from said chamber to a discharge opening located adjacent the outer end of said tubular members, first drive means to operate the conveyor means, turntable means rotatably mounted on said housing, material collector means mounted on the turntable means, said collector means extended from the turntable means toward the outer portion of the storage area, power transmitting means connecting said conveyor means to said material collector means whereby said first drive means simultaneously operates said conveyor means and material collector means, second drive means operably connected to said turntable means to rotate the turntable means and move said material collector means relative to said floor whereby the material collector means moves material toward said turntable means and meters the material into the chamber and said conveyor means moves the material from the chamber to said location externally of the storage area, and an end section having a material discharge opening secured to the tubular members, door means engageable with said end section for closing the discharge opening, and releasable clamping means engageable with said door means for holding the door means in engagement with said end section closing said discharge opening, said releasable clamping means comprises fixed sleeve means, roller means rotatably located in the sleeve means, arm means engageable with said door means, pivot means eccentrically connecting said arm means to the roller means, and lever means connected to the roller means to facilitate rotation of the roller means in one direction whereby the pivot means moves the arm means to a position to hold the door means in engagement with said end section to close said discharge opening and rotation in the direction opposite said one direction operates to release the door means whereby the door means can be moved to an open position.

16. The apparatus of claim 15 wherein: the first drive means includes a support mounted on the material conveying means, said sleeve means being secured to said support.

17. An apparatus for removing material from a material storage area having a floor for accommodating the material comprising: a housing having a chamber locatable in the central portion of the material storage area, material conveying means extended from the housing to a location externally of the storage area, said conveying means have a movable conveyor operable to move material from the chamber to said location, said conveying means including a pair of tubular members connected to the housing, each of said tubular members having a passage open to the chamber, said movable conveyor extended through said passages operable to move material from said chamber to a discharge opening located adjacent the outer end of said tubular members, first drive means to operate the conveyor means, turntable means rotatably mounted on said housing, material collector means mounted on the turntable means, said collector means extended from the turntable means toward the outer portion of the storage area, power transmitting means connecting said conveyor means to said material collector means whereby said first drive means simultaneously operates said conveyor means and material collector means, second drive means operably connected to said turntable means to rotate the turntable means and move said material collector means relative to said floor whereby the material collector means moves material toward said turntable means and meters the material into the chamber and said conveyor means moves the material from the chamber to said location externally of the storage area, and an end section having a material discharge opening secured to the tubular members, door means engageable with said end section for closing the discharge opening, and releasable clamping means engageable with said door means for holding the door means in engagement with said end section closing said discharge opening, said first drive means includes a support mounted on the material conveying means, said support having side members located adjacent opposite sides of the end section, the releasable clamping means comprises a pair of clamp and lock assemblies located adjacent opposite sides of the end section, a sleeve secured to each side member, a roller rotatably located in each sleeve, a first arm engageable with one side of the door means, a first pivot eccentrically connecting the first arm to one roller, a second arm engageable with the other side of the door means, a second pivot eccentrically connecting the second arm to the other roller, and arm means secured to each roller to facilitate rotation of the rollers whereby the first and second pivots move the first and second arms to positions to hold the door means in engagement with said end section to close said discharge opening.

18. An apparatus for removing material from a material storage area having a floor for accommodating the material comprising: a housing having a chamber locatable in the central portion of the material storage area, material conveying means extended from the housing to a location externally of the storage area, said conveying means having a movable conveyor operable to move material from the chamber to said location, first drive means to operate the conveyor, turntable means rotatably mounted on said housing, material collector means mounted on the turntable means, said collector means extended from the turntable means toward the outer portion of the storage area, said material collector means comprising an elongated auger means having helical flight means, non-rotatable support means mounting the auger means on the turntable means for rotation about its longitudinal axis, power transmitting means connecting said conveyor to said material collector means whereby said first drive means simultaneously operates said conveyor and material collector means, said power transmitting means being connected to said auger means whereby on operation of the movable conveyor the power transmitting means rotates said auger means and second drive means operatively connected to said turntable means to rotate the turntable means and move said auger means relative to said floor independently of the operation of the conveyor and rotation of the auger means whereby the auger means moves material towards said turntable means and meters the material into the chamber and said conveyor moves the material from the chamber to said location externally of the storage area.

19. The apparatus of claim 18 wherein: the auger support means includes a non-rotatable tube, said auger means having tubular means rotatably mounted on said tube.

20. The apparatus of claim 19 wherein: said auger means includes a shaft secured to the tubular means, said shaft extended through the non-rotatable tube, and means rotatably mounting the shaft on the tube.

21. The apparatus of claim 20 wherein: said shaft has an outer end section projected longitudinally from the tubular means, said helical flight means being secured to said tubular means and outer end section of the shaft.

22. The apparatus of claim 18 wherein: said auger support means includes a non-rotatable tube, said auger means having a first tubular member surrounding and rotatably mounted on the tube, a second tubular member having an inner end and an outer end, said inner end being secured to the first tubular member, a shaft extended through the tube and second tubular member, said shaft being rotatably mounted on the tube, said outer end of the second tubular member being secured to said shaft, said helical flight means surrounding and secured to said first and second tubular members.

23. The apparatus of claim 22 wherein: the helical flight means secured to the first tubular member has a diameter that is larger than the diameter of the helical flight means secured to the second tubular member.

24. The apparatus of claim 22 wherein: said shaft has an end section projected outwardly from said second tubular member, said helical flight means surrounding and secured to said end section.

25. The apparatus of claim 24 wherein: the helical flight means secured to the second tubular member has a diameter that is larger than the diameter of the helical flight means secured to the end section of the shaft.

26. The apparatus of claim 22 wherein: the second tubular member has a longitudinal passage having a diameter substantially the same as the diameter of the shaft.

27. A material conveying apparatus comprising: means for carrying material from a first location to a second location, conveyor means associated with said means for carrying the material for moving the material from a first location to a second location, said means for carrying material including a material discharge section having a material discharge opening, door means for selectively opening and closing said discharge opening, said door means locatable in engagement with said section to close said opening, and releasable clamping means engageable with said door means for holding the door means in engagement with said section thereby closing said discharge opening, releasable clamping means comprising fixed sleeve means, roller means rotatably located in the sleeve means, arm means engageable with said door means, pivot means eccentrically connecting said arm means to the roller means, and lever means connected to the roller means to facilitate rotation of the roller means in one direction whereby the pivot means moves the arm means to a position to hold the door means in engagement with said section to close said discharge opening and rotation in the direction opposite said one direction to release the door means whereby the door means can be moved to an open position.

28. The apparatus of claim 27 including: a support means mounted on the means for carrying material, said sleeve means being secured to said support means.

29. A material conveying apparatus comprising: means for carrying material from a first location to a second location, conveyor means associated with said means for carrying the material for moving the material from a first location to a second location, said means for carrying material including a material discharge section having a material discharge opening, door means for selectively opening and closing said discharge opening, said door means locatable in engagement with said section to close said opening, and releasable clamping means engageable with said door means for holding the door means in engagement with said section thereby closing said discharge opening, support means mounted on the means for carrying material, said support means having side members located adjacent opposite sides of said material discharge section, said releasable clamping means comprising a pair of clamp and lock assemblies located adjacent the opposite sides of said section, a sleeve secured to each side member, a roller rotatably located in each sleeve, a first arm engageable with one side of the door means, a first pivot eccentrically connecting the first arm to one roller, a second arm engageable with the other side of the door means, a second pivot eccentrically connecting the second arm to the other roller, lever means secured to each roller to facilitate the rotation of the roller whereby the first and second pivots move the first and second arms to positions to hold the door means in engagement with said material discharge section to close said discharge opening.

30. An apparatus for removing material from a material storage area comprising: housing means having a chamber locatable in an interior portion of said storage area, material conveying means extended from the housing means to a location externally of the storage area, said conveying means having a movable conveyor operable to move material from the chamber to said location, first drive means for operating the conveyor, material collector means extended from the interior portion of the storage area toward an outer portion of the storage area for moving material into the chamber, means mounting said collector means on the housing means for movement around said material storage area, means for operating said material collector means, said means mounting said collector means includes a non-rotatable tube having a longitudinal passage, said collector means including tubular means surrounding and rotatably mounted on the tube, helical flight means surrounding and secured to the tubular means, shaft means extended through the tube and rotatably mounted on the tube, said shaft means being secured to the tubular means and operably connected to the first drive means whereby on rotation of the shaft means the tubular means rotates the helical flight means, second drive means operably connected to said means mounting said collector means to move said collector means around said storage area independently of the operation of said conveyor and material collector means whereby the collector means meters material into the chamber and said conveyor moves the material from the chamber to said location externally of the storage area, and means cooperating with the material collector means to limit movement of material into the chamber of the housing means and meter the material by the material collector means into said chamber.

31. The apparatus of claim 30 wherein: the means for operating the material collector means comprise power transmitting means drivably connecting said conveyor means to said material collector means whereby said first drive means simultaneously operates said conveyor means and material collector means.

32. The apparatus of claim 30 wherein: the means cooperating with the material collector means limiting movement of material into the chamber comprises a cap having a side wall and a top wall mounted on the side wall, said side wall having an opening, said material collector means projecting through said opening.

33. The apparatus of claim 32 wherein: the top wall has an upwardly converging cone shape.

34. The apparatus of claim 32 wherein: said material collector means comprises an elongated auger assembly having helical flight means, said auger assembly being rotated about its longitudinal axis with said means for operating said material collecting means.

35. The apparatus of claim 30 wherein: said shaft means has an outer end section projected longitudinally from the tubular means, said helical flight means being secured to said tubular means and said outer end section of the shaft means.

36. The apparatus of claim 30 wherein: said tubular means comprises a first tubular member surrounding and rotatably mounted on the tube, and a second tubular member having an inner end and an outer end, said inner end being secured to the first tubular member, said shaft means extended through the fixed tube and second tubular member, said outer end of the second tubular member being secured to said shaft means, said helical flight means surrounding and secured to the said first and second tubular members.

37. The apparatus of claim 36 wherein: the helical flight means surrounding the first tubular member has a diameter that is larger than the diameter of the helical flight means secured to the second tubular member.

38. The apparatus of claim 36 wherein: said shaft means has an end section projected outwardly from said second tubular member, said helical flight means surrounding and being secured to said end section of the shaft means.

39. The apparatus of claim 38 wherein: the helical flight means secured to the second tubular member has a diameter that is larger than the diameter of the helical flight means secured to the end section of the shaft means.

40. The apparatus of claim 36 wherein: the second tubular member has an elongated passage having a diameter substantially the same as the diameter of the shaft means.

41. An apparatus for removing material from a material storage area comprising: housing means having a chamber locatable in an interior portion of said storage area, material collector means extended from the interior portion of the storage area toward an outer portion of the storage area for moving material into the chamber, means mounting said collector means on the housing means for movement around said material storage area, means for operating said material collector means, said means mounting said collector means includes a non-rotatable tube having a longitudinal passage, said collector means including tubular means surrounding and rotatably mounted on the tube, shaft means extended through the tube and rotatably mounted on the tube, said shaft means being secured to the tubular means and operably connected to the means for operating said material collector means whereby on rotation of the shaft means the tubular means rotates the helical flight means, drive means operably connected to said means mounting said collector means to move said collector means around said storage area independently of the operation of said material collector means whereby the collector means meters material into the chamber, and means cooperating with the material collector means to limit movement of material into the chamber of the housing means and meter the material by the material collector means into said chamber.

42. The apparatus of claim 41 wherein: the means limiting movement of material into the chamber comprises a cap having a side wall and a top wall mounted on the side wall, said side wall having an opening, said material collector means projecting through said opening.

43. The apparatus of claim 42 wherein: the top wall has an upwardly converging cone shape.

44. The apparatus of claim 42 wherein: said material collector means comprises an elongated auger assembly having helical flight means, said auger assembly being rotated about its longitudinal axis with said means for operating said material collecting means.

45. The apparatus of claim 41 wherein: said shaft means has an outer end section projected longitudinally from the tubular means, said helical flight means being secured to said tubular means and said outer end section of the shaft means.

46. The apparatus of claim 41 wherein: said tubular means comprises a first tubular member surrounding and rotatably mounted on the tube, and a second tubular member having an inner end and an outer end, said inner end being secured to the first tubular member, said shaft means extended through the tube and second tubular member, said outer end of the second tubular member being secured to said shaft means, said helical flight means surrounding and secured to the said first and second tubular members.

47. The apparatus of claim 46 wherein: the helical flight means surrounding the first tubular member has a diameter that is larger than the diameter of the helical flight means secured to the second tubular member.

48. The apparatus of claim 46 wherein: said shaft means has an end section projected outwardly from said second tubular member, said helical flight means surrounding and being secured to said end section of the shaft means.

49. The apparatus of claim 48 wherein: the helical flight means secured to the second tubular member has a diameter that is larger than the diameter of the helical flight means secured to the end section of the shaft means.

50. The apparatus of claim 46 wherein: the second tubular member has an elongated passage having a diameter substantially the same as the diameter of the shaft means.

* * * * *